Oct. 15, 1957 F. D. LEMKEY 2,809,715
AIR FILTER
Filed March 24, 1955
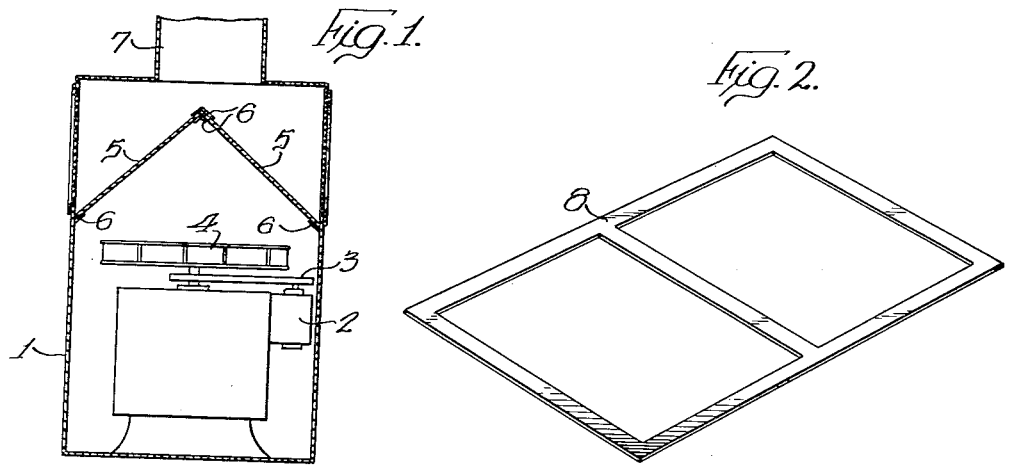
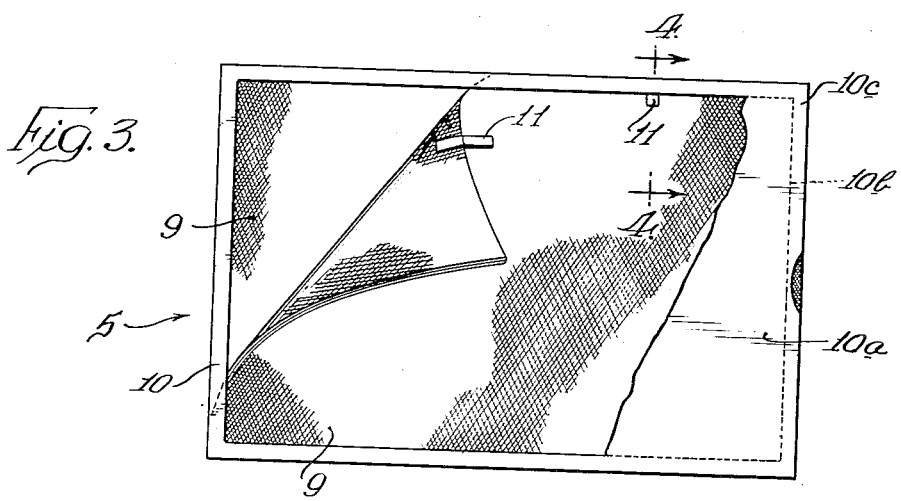
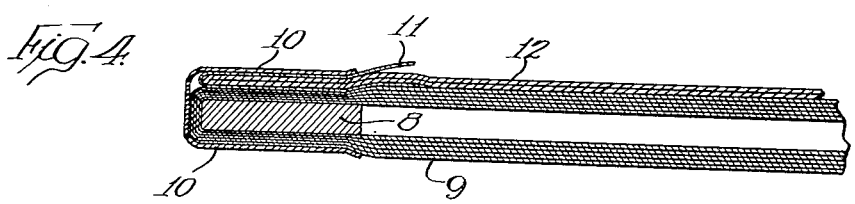
INVENTOR.
Franklin D. Lemkey,
BY
Brown, Jackson, Boettcher & Dienner
Attys

United States Patent Office 2,809,715
Patented Oct. 15, 1957

2,809,715

AIR FILTER

Franklin D. Lemkey, Oak Park, Ill.

Application March 24, 1955, Serial No. 496,393

2 Claims. (Cl. 183—69)

This invention relates to a novel filter for removing gas-entrained solids and more particularly relates to an air filter inexpensively constructed and especially adapted for use in home heating units of the forced air type.

In the present day home heating installations of either the oil or gas fired type the forced air system has achieved extensive application. In these units, return air is filtered and blown or forced over heated baffles and on through ductwork to the several rooms in the home. Because the air is forcibly recirculated and collected within the body of the furnace to be heated, it is conveniently filtered at that point to remove entrained dirt, dust and lint. For such filtration viscous filters and dry filters have been developed in package form permitting easy installation and replacement. The package generally consists of a fibrous frame about 24″ x 18″ such as can be made of cardboard. The turned edges of the cardboard frame cover the borders of the face and back surfaces of the filter which face and back ordinarily consist of perforated sheets of aluminum or other reasonably rigid material. Between the face and back perforated sheets the mat or pad of filter material is held in place, that filter mat consisting of a wide variety of materials such as spun glass, fine wire, or metal screening. These materials either in the form of straight strands or fluffy form a very light mass which with the contained air spaces constitute a devious path for the volume of air moving through the filters.

As commercially developed, the foregoing filters when used in a dry state are made with substantial bulk on the order of two inches in thickness. The extra bulk makes for smaller air passages which are more devious and therefore of greater length. Unlike the dry filter which relies essentially on only the bulk of the filter medium to retain entrained particles, a similarly constructed filter often contains a filter mat coated with a non-volatile liquid film which picks up and retains dust and dirt particles, the use of a liquid film making possible larger passages for air flow through the filter mat and also permitting a thinner mat and higher air velocity.

Although the metal filter media can theoretically be cleaned and re-used, the actual cleaning of either wet or dry filters is not practicable. Use of a vacuum cleaner which produces a reverse flow through the pad is laborious and not really effective in a full sense of the word. The flimsy form of the filter pad prohibits its separation and removal from the face and back sheets and surrounding frame and therefore any water washing or dry cleaning which would wet the cardboard frame is out of the question. Moreover, effective revitalizing of the cleaned oil-coated type of filter medium entails uniform re-oiling of the mat which is not practically possible.

For the foregoing reasons the end result for present day home furnace filters is either a short-term period of use followed by discarding of the old and replacement with a new filter or protracted use of a dirty, inefficient filter which causes a substantial pressure drop and decreased air capacity for the filter itself and the heating system in general. Either course is rather expensive, the cost of replacing the two ordinarily required filter units being on the order of five dollars which would be necessary two times per year for best results. Needless to say, the cost of failing to replace filter units is surely higher in the form of heat losses although less conspicuous than replacement costs to be sure.

Accordingly, it is an object of this invention to provide an inexpensive gas filter with a readily washable filter medium.

A further object of this invention is to provide a filter having a filter medium in such form that it can be easily removed for washing and simply returned to the same filter frame.

It is a further object of this invention to provide a filter having a filter medium which is either easily washed or economically discarded.

These and other related objects are achieved by my invention wherein a loosely woven cloth is wrapped around a durable frame and held firmly in place on the frame by means of a sleeve having a peripheral configuration corresponding to the configuration of the frame.

Further description of the invention can be had by reference to the accompanying drawings wherein Fig. 1 is a schematic elevation of the air chamber within a conventional forced air furnace. Fig. 2 shows the frame component of the present invention. The filter of this invention is shown in Fig. 3, a section 4—4 of Fig. 3 being shown in Fig. 4.

As has been stated, Fig. 1 is a schematic elevation of the air chamber within a conventional forced air furnace 1 from which the entire back panel is removed. Air is drawn into the air chamber through a cold air return inlet 7. In this particular representation of a gas or oil fired furnace, the air is pulled downwardly by electric motor 2 connected through belt 3 to blower 4. Before passing into blower 4 the air passes through filters 5, which are held in position by brackets 6, and on into the heat dome (not shown) for distribution through the heating system. It is the composition and construction of filters 5 for use in such a heating system that constitute the present invention.

The first component of the present invention is the frame 8 portrayed in Fig. 2. This constitutes the form for the complete filter serving to provide the necessary rigidity for the filter medium to be subsequently described. The composition of frame 8 is subject to considerable variation from cardboard or wooden slats in its most inexpensive form to thin plastic or sheet metal in a more expensive variety. There is little, if any, strain on the frame and accordingly it need only be the means of providing form or shape and some necessary support for the filter medium.

The filter of Fig. 3 is a novel combination of frame 8, filter medium 9 and sleeve 10. Filter medium 9 consists of loosely woven cloth wrapped around the frame which is therefore not visible, the filter medium being held in place against the edges of the frame by sleeve 10. Elements 11 are tabs secured on the margin of that portion of filter medium 9 shown here as a saparate section 12 of cloth filter medium not wrapped around frame 8 but separately held in place as an overlay by sleeve 10. Tabs 11 are of a length permitting their extension from under the margin 10c of sleeve 10 so they may be gripped.

Sleeve 10 as shown in Fig. 3 is a flattened tube or bag having on each side a central, removable section 10a connected along a perforated line 10b with the margin 10c, as shown fragmentarily on Figure 3. When the central sections are removed there are provided window portions in both front and rear faces through which air passes in entering and leaving the cloth filter medium. Where sleeve 10 is in the form of a bag the frame and filter medium will be inserted from only the open end of the bag but will obviously be insertable from either end where sleeve 10 is formed from a tube. In either case, sleeve 10 in flattened state has a peripheral configuration corresponding generally to that of frame 8. Although it is not so shown, the configuration of sleeve 10 may have a center strap overlying that of frame 8.

Of course, the sleeve 10 can be formed with the central sections 10a omitted entirely instead of being removable. However in marketing or general distribution, the sleeve 10 with sections 10a provided as shown, can serve as the sales envelope or case. The user then forms the window portions on the front and back walls by removing sections 10a along the perforated lines 10b.

In a specific form of the invention which I have developed the frame was corrugated cardboard of the variety consisting of an inner corrugated paper ply and smooth face and back plies giving rigidity to the inner corrugated layer. Around the two longer edges of the frame a continuous length of tobacco cloth or cheese cloth having a 24 x 20 weave was wrapped five times to give ten layers of cloth thickness for the filter medium. Overlying this on one side I placed several folded layers of the same cheesecloth. Over the wrapped-around and the overlaid sections of cloth I fitted a heavy kraft paper sleeve in the form of an open walled bag, the frame 8 with cheesecloth wrapping being inserted through the mouth or open end of the bag.

Because it is contemplated that the cloth filter medium be only frictionally held in place against the frame to facilitate removal of the medium for washing or cleaning, the filter medium is optimally a single piece of material wrapped continuously around either the ends or longer sides of the frame. Preferably the cloth medium will be wrapped around the longer edges since this will give the greater degree of contact between cloth and frame.

I prefer to employ a one or two ply overlay, such as overlay 12, on the intake side which can be conveniently removed mid-way through the heating season by pulling on tabs 11. Overlay 12 can be washed and used again or may be discarded. Overlay 12 preferably is placed on that side of the structure opposite from the side where the wound cloth terminates, since removal of overlay 12 then will not pull loose the end of the wrapped-around cloth.

The heavy build-up of dust and dirt on the intake side of the filter is thus easily and economically removed without serious reduction in filter thickness and with a considerable increase in filter capacity at that point. Whether or not such an overlay is employed, it will be appreciated that the complete cloth filter medium can be quickly removed by unwrapping from the frame, followed by washing of the medium and re-wrapping of the frame.

Various modifications of the total filter may occur to one as the result of studying the described device and for that reason there is no intention to arbitrarily limit the invention. For example, the frame is obviously subject to some modification of the center strip to possibly provide two such strips for supporting the filter medium the number and location of such strips being chosen with due regard to air speeds and overall filter efficiency.

Having thus described my invention, I claim:

1. A gas filter comprising a frame, a first cloth filter medium wrapped around said frame and terminating on one side of the latter, a second cloth filter medium overlying that side of said first filter medium opposite from its terminal end, a generally flat bag-like member fitting over said frame and two cloth filter mediums and having central sections on opposite sides connected with margins of the bag by perforations whereby said center sections are removable to provide windows, and manually engageable means on said second filter medium whereby the same may be separated from said first filter medium and withdrawn through a window of said bag-like member.

2. A gas filter comprising a generally flat frame, a first cloth filter medium wrapped around said frame in one direction and having a terminal end, a second cloth filter medium overlying one side of said first cloth filter medium, and a generally flat sleeve-like member fitting over said cloth filter mediums and frame and assisting in holding said cloth filter mediums in filtering position, said sleeve-like member having front and rear window portions, manually engageable means on said second filter medium located adjacent that one of its margins, whereby the means, when used to withdraw said second cloth filter medium through one of said window portions, will be drawn in the same direction as said first cloth filter medium was wound when placed on the frame, so that the terminal end of said first cloth filter medium is not unwound.

References Cited in the file of this patent

UNITED STATES PATENTS

| | | |
|---|---|---|
| 450,322 | Segal | Apr. 14, 1891 |
| 1,691,967 | Gammeter | Nov. 20, 1928 |
| 2,118,271 | Slayter | May 24, 1938 |
| 2,137,246 | Myers | Nov. 22, 1938 |
| 2,138,874 | Myers | Dec. 6, 1938 |

FOREIGN PATENTS

| | | |
|---|---|---|
| 630,453 | Germany | May 28, 1936 |
| 713,560 | Great Britain | Aug. 11, 1954 |
| 817,302 | Germany | Oct. 15, 1951 |